UNITED STATES PATENT OFFICE.

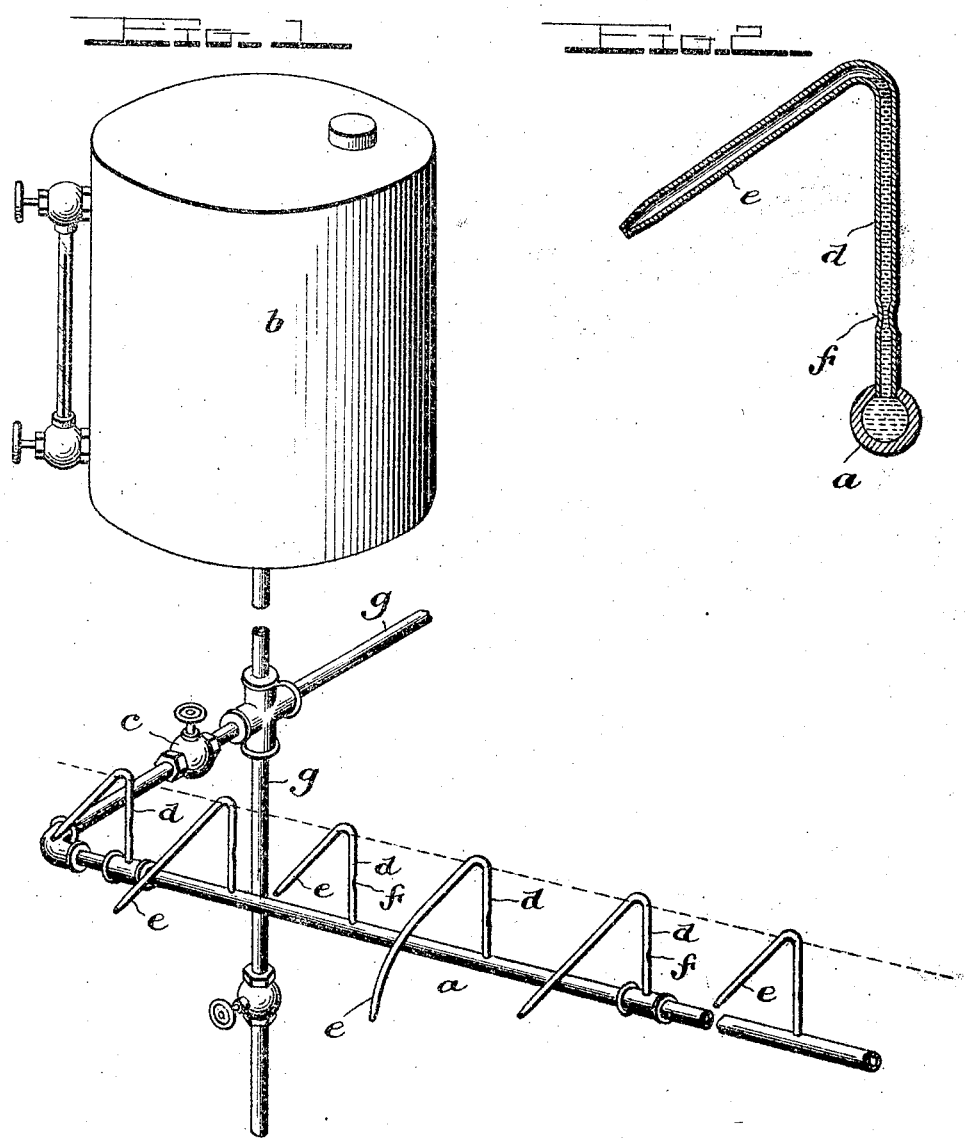

GEORGE CAPE ELDERS, OF ENOREE, SOUTH CAROLINA, ASSIGNOR OF ONE-HALF TO BEVERLY O. CHILDERS, OF ENOREE, SOUTH CAROLINA.

LUBRICATING SYSTEM.

1,121,908.  Specification of Letters Patent.  Patented Dec. 22, 1914.

Application filed February 13, 1914. Serial No. 818,479.

*To all whom it may concern:*

Be it known that I, GEORGE C. ELDERS, a citizen of the United States of America, and a resident of Enoree, county of Spartanburg, and State of South Carolina, have invented certain new and useful Improvements in Lubricating Systems, of which the following is a full and clear specification, reference being had to the accompanying drawings, in which—

Figure 1 is a perspective view showing my system in one of its simplest forms; and Fig. 2 is a transverse vertical section taken through one of the stand pipes.

The object of this invention is to provide a simple apparatus for supplying a liquid lubricant to a series of bearings in uniform or regulated quantities, whether said bearings be in the same plane or not, as more fully hereinafter set forth.

The main supply pipe $a$ is connected to any suitable apparatus for supplying oil under pressure, an elevated tank $b$ being shown in the accompanying drawings as an example. A manually controlled valve $c$ is placed in this pipe at any suitable point between the source and the several delivery nozzles. At intervals along the supply pipe $a$ beyond the valve is a series of stand pipes $d$, whose lower ends are in connection with the interior of the supply pipe and whose upper ends are each connected to a delivery pipe $e$, these delivery pipes being arranged to incline downwardly from every point of connection to the stand pipes.

It will be observed that when the valve $c$ is opened, the supply pipe and stand pipes will be filled with oil and that as the level rises in the several stand pipes the oil will flow over into the delivery pipe $e$ and down these pipes to the respective bearings. These pipes are preferably of bendable tubing so that they may be adjusted so as to deliver the oil properly to the bearings, and it is obvious that these delivery pipes may be of varying length and may be bent to deliver the oil at varying levels, but in all cases the point at which the oil passes from the stand pipe to the delivery pipe will be on the same level in all the stand pipes, so that when any oil is delivered into the supply pipe the oil in all the stand pipes will rise and delivery will take place in each one of the stand pipes, to the end that all the bearings will be simultaneously oiled and an approximately uniform quantity of oil will be supplied to each bearing, provided the stand pipes are of the same interior diameter.

It will be observed that not only must the delivery points in the stand pipes be on the same level, but also that the delivery pipes shall incline downwardly from the delivery points, so that the oil will gravitate to the point of exit. Should it be desired to stop the delivery of oil to any one bearing, the malleability of the delivery pipe will permit it to be bent upwardly far enough to bring its exit or nozzle end above the level of the fluid in the stand pipes, whereupon the delivery of oil from that pipe will cease.

In those cases where a very light delivery of oil is needed and it is therefore desirable to obtain a high degree of accuracy in the uniformity of feed, any suitable means may be used to prevent those delivery pipes located nearest to the source of supply from delivering a greater quantity than those located farther off from the supply; as a simple way of accomplishing this graduated feed, I may choke the supply through the stand pipe by bending or pinching the same, as shown at $f$ in Fig. 2, in which manner it will be possible to choke each stand pipe to a sufficient degree to give to each a supply of oil especially adapted for the particular bearing which it is to supply. In this manner a very large number of bearings, greatly varying in height and distance with respect to each other and the source of supply, may be properly lubricated by the simple act of operating a single valve between the source of supply and the first one of the series of delivery devices, it being understood that in all cases the delivery points in all the stand pipes shall be not only at a common level, but also above the level of the highest bearing that is to be lubricated.

Any suitable number of supply pipes may be connected to the source of supply, so long as each one is controllable by its own valve; I have shown at $g$ two additional supply pipes, to each of which may be connected another series of delivery devices arranged to deliver at the same level or at a higher level than the one illustrated, provided in all cases that the pressure at the source shall be sufficient to force the oil to the tops of the stand pipes.

In most cases a proper oiling of the bearings can be secured by simply momentarily opening the valve $c$ at intervals, but it will be understood that this valve may be kept slightly open during the entire time the machinery is running, so that the delivery nozzles constantly drop oil into their respective bearings.

Having thus described my invention, what I claim is:

1. In an apparatus for lubricating, a plurality of bearings, a source for supplying oil under pressure, a supply pipe connected thereto and provided with a valve, and a series of oil delivering devices distributed along the supply pipe at intervals beyond said valve, each of these delivery devices consisting of a stand pipe connected to the supply pipe at its lower end and connected at its upper end to a delivery pipe, said delivery pipe inclining downwardly from the point of connection to the stand pipe and the points of delivery from the stand pipe into said delivery pipes being all in the same horizontal plane, for the purpose set forth.

2. In an apparatus for lubricating, a plurality of bearings, a source for supplying oil under pressure, a supply pipe connected thereto and provided with a valve, and a series of oil delivering devices distributed along the supply pipe at intervals beyond said valve, each of these delivery pipes consisting of a stand pipe connected to the supply pipe at its lower end and connected at its upper end to a delivery pipe, said delivery pipe inclining downwardly from the point of connection to the stand pipe and the points of delivery from the stand pipe into said delivery pipes being all in the same horizontal plane, for the purpose set forth, means being provided for choking or restricting the supply of oil through those stand pipes which are nearest to the source of supply.

In testimony whereof I hereunto affix my signature in the presence of two witnesses.

GEORGE CAPE ELDERS.

Witnesses:
N. N. HANNA,
H. H. OWENS.